US009665577B2

United States Patent
Kapoor et al.

(10) Patent No.: US 9,665,577 B2
(45) Date of Patent: *May 30, 2017

(54) CONTROLLING ENTERPRISE DATA ON MOBILE DEVICE VIA THE USE OF A TAG INDEX

(75) Inventors: Shalini Kapoor, Bangalore (IN); Palanivel A. Kodeswaran, Bangalore (IN); Sridhar R. Muppidi, Austin, TX (US); Nataraj Nagaratnam, Cary, NC (US); Vikrant Nandakumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 668 days.

This patent is subject to a terminal disclaimer.

(21) Appl. No.: 13/471,541

(22) Filed: May 15, 2012

(65) Prior Publication Data
US 2013/0305058 A1 Nov. 14, 2013

Related U.S. Application Data

(63) Continuation of application No. 13/470,662, filed on May 14, 2012.

(51) Int. Cl.
G06F 17/30 (2006.01)
H04W 12/08 (2009.01)

(52) U.S. Cl.
CPC ........ *G06F 17/3007* (2013.01); *H04W 12/08* (2013.01)

(58) Field of Classification Search
USPC ....................................................... 707/741
See application file for complete search history.

(56) References Cited

U.S. PATENT DOCUMENTS

| 7,644,096 B2 | 1/2010 | Sjolander |
| 7,917,963 B2 | 3/2011 | Goyal et al. |
| 7,971,231 B2 * | 6/2011 | Gupta et al. ...................... 726/1 |
| 7,996,015 B2 | 8/2011 | Bloebaum |
| 2003/0028850 A1 * | 2/2003 | Quinn et al. .................. 715/530 |

(Continued)

OTHER PUBLICATIONS

Good, Data Loss Prevention Whitepaper, 2011.*

(Continued)

*Primary Examiner* — William Spieler
(74) *Attorney, Agent, or Firm* — Robert A. Voigt, Jr.; Winstead, P.C.

(57) ABSTRACT

A method, system and computer program product for controlling enterprise data on mobile devices. Data on a mobile device is tagged as being associated with either enterprise data or with personal data. Upon identifying the storage location of the tagged data and the identifier of the application that generated the tagged data, the tag, the storage location of the tagged data and the identifier of the application are stored in an index. A mobile agent residing on the mobile device may be directed by a mobile device management server of the enterprise to perform various actions (e.g., deleting, encrypting, backing-up) on the enterprise data using the index. In this manner, the enterprise has the ability to control their applications and data that resides on employees' mobile devices to ensure that such data is not lost or used in a manner that is contrary to the wishes of the employer.

18 Claims, 8 Drawing Sheets

(56) References Cited

U.S. PATENT DOCUMENTS

| | | | |
|---|---|---|---|
| 2004/0059966 A1* | 3/2004 | Chan et al. | 714/48 |
| 2006/0224742 A1 | 10/2006 | Shahbazi | |
| 2007/0250784 A1* | 10/2007 | Riley et al. | 715/764 |
| 2007/0266422 A1 | 11/2007 | Germano et al. | |
| 2008/0148042 A1 | 6/2008 | Brown et al. | |
| 2008/0177704 A1* | 7/2008 | Denney et al. | 707/3 |
| 2008/0178300 A1 | 7/2008 | Brown et al. | |
| 2008/0276177 A1* | 11/2008 | Sauve | 715/733 |
| 2009/0150970 A1 | 6/2009 | Hinds et al. | |
| 2010/0081417 A1 | 4/2010 | Hickie | |
| 2010/0115092 A1 | 5/2010 | Westin | |
| 2010/0211535 A1* | 8/2010 | Rosenberger | 706/20 |
| 2010/0299152 A1 | 11/2010 | Batchu et al. | |
| 2010/0299376 A1 | 11/2010 | Batchu et al. | |
| 2011/0093768 A1* | 4/2011 | Panwar | 714/809 |
| 2011/0167474 A1 | 7/2011 | Sinha et al. | |
| 2012/0311659 A1* | 12/2012 | Narain et al. | 726/1 |

OTHER PUBLICATIONS

"Method and System for Enabling Mobile Applications within an Enterprise," http://ip.com/IPCOM/000208290, Jun. 29, 2011.

Nakarmi, Prajwol Kumar, "Remote Wiping of Mobile Devices," http://users.tkk.fi/pnakarmi/remote_wipe.pdf, Dec. 12, 2008.

Landman, Max, "Managing Smart Phone Security Risks," http://dl.acm.org/citation.cfm?id=1940971, 2010 Information Security Curriculum Development Conference, 2010.

Friedman et al., "Protecting Data on Mobile Devices: A Taxonomy of Security Threats to Mobile Computing and Review of Applicable Defenses," Computer Science, Information Technology and Managerial Sciences, vol. 7, No. 1-2, 2008.

Office Action from U.S. Appl. No. 13/470,662 dated Mar. 14, 2013.

"Data Loss Prevention Whitepaper," Good Technology, 2011.

Office Action for U.S. Appl. No. 13/470,662 dated Aug. 9, 2013.

Office Action for U.S. Appl. No. 13/470,662 dated Dec. 17, 2013, pp. 1-16.

Office Action for U.S. Appl. No. 13/470,662 dated May 5, 2014, pp. 1-25.

* cited by examiner

CONTROLLING ENTERPRISE DATA ON MOBILE DEVICE VIA THE USE OF A TAG INDEX

CROSS-REFERENCE TO RELATED APPLICATIONS

The present application is a continuation application of pending U.S. patent application Ser. No. 13/470,662, which was filed on May 14, 2012, which is assigned to the assignee of the present invention. The present application claims priority benefits to U.S. patent application Ser. No. 13/470,662.

TECHNICAL FIELD

The present invention relates generally to mobile devices, and more particularly to controlling enterprise data on mobile devices via the use of a tag index.

BACKGROUND

A mobile device (also known as a handheld device, handheld computer or simply handheld) is a small, hand-held computing device, typically having a display screen with touch input and/or a miniature keyboard and weighting less than 2 pounds (0.91 kg). Examples of mobile devices include a mobile phone, a cellular phone, a smartphone, a person digital assistant (PDA), an index personal computer and the like.

Such devices are being used more and more by employees of enterprises (referring to businesses, companies, government entities, etc.) enabling the employees to work from remote locations. These mobile devices are often owned by the employees as opposed to the employers.

Employees that are performing work on their mobile devices may be storing enterprise data on the mobile devices. Enterprise data on the mobile device may come from various sources, such as from enterprise applications, attachments in personal e-mails and so forth. However, the enterprise does not have any control over their applications or data that resides on these mobile devices which may have ramifications. For example, if the user lost his/her mobile device, then the enterprise data, which may be confidential, on the mobile device may be accessible by third parties, especially if the data is not encrypted or secured in some manner. In another example, if the user leaves the enterprise, then the former employee may have the freedom to dispense with the enterprise data in a manner that may be contrary to the wishes of the former employer.

As a result, the enterprise needs the ability to control their applications and data that resides on employees' mobile devices to ensure that such data is not lost or used in a manner that is contrary to the wishes of the employer.

BRIEF SUMMARY

In one embodiment of the present invention, a method for controlling enterprise data on mobile devices comprises tagging data on a mobile device as being associated with either enterprise data or personal data with a tag. The method further comprises identifying a storage location of the tagged data. Additionally, the method comprises obtaining an identifier of an application that generated the tagged data. In addition, the method comprises storing, by a processor, the tag, the storage location of the tagged data and the identifier of the application in an index.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for controlling enterprise data on mobile devices. In one embodiment of the present invention, data on a mobile device is tagged as being associated with either enterprise data or with personal data. Upon identifying the storage location of the tagged data and obtaining the identifier of the application that generated the tagged data, the tag, the storage location of the tagged data and the identifier of the application are stored in an index (referred to herein as the "tag index"). A mobile agent residing on the mobile device may be directed by a mobile device management server of the enterprise to perform various actions on the enterprise data, such as deleting, backing-up, encrypting, applying access control, etc. using the tag index. In this manner, the enterprise has the ability to control their applications and data that resides on employees' mobile devices to ensure that such data is not lost or used in a manner that is contrary to the wishes of the employer.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
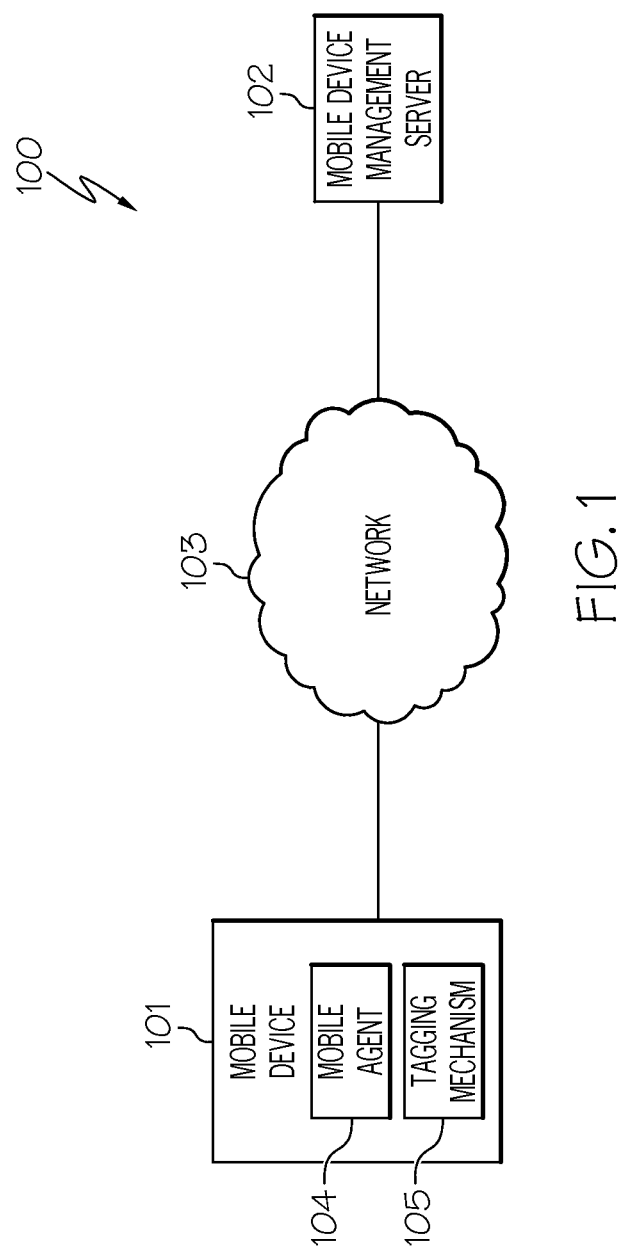
FIG. 1 illustrates a network system configured in accordance with an embodiment of the present invention.

Referring now to the Figures in detail, FIG. 1 illustrates a network system 100 configured in accordance with an embodiment of the present invention. Network system 100 includes a mobile device 101 in wireless communication with a server (mobile device management server) 102 via a network 103. Mobile device 101 may be any mobile computing device, including, but not limited to, a mobile phone, a cellular phone, a smartphone, a personal digital assistance (PDA), a gaming unit, a portable computing unit, a tablet personal computer, and the like. System 100 may include any number of mobile devices 101 and the depiction of a single mobile device 101 is for illustrative purposes. A description of one embodiment of the hardware configuration of mobile device 101 is provided below in connection with FIG. 2.

As discussed above, mobile device 101 is in wireless communication with a management server 102 via a network 103, which may be, for example, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Management server 102 is configured to manage the enterprise data being stored on mobile device 101 as discussed further below. In particular, management server 102 may reside at an enterprise (e.g., company, business, government entity) and attempt to control their applications and data residing on mobile device 101 by issuing commands to a software agent 104, such as a mobile agent, residing on mobile device 101 directed to performing various actions on the enterprise data, such as deleting, backing-up, encrypting, applying access control, etc. Mobile agent 104 is configured to implement the commands received from management server 102.

Additionally, mobile device 101 includes a software component referred to herein as the "tagging mechanism" 105 configured to tag the data on mobile 101 as being either enterprise data or personal data. In one embodiment, mobile device 101 includes different tagging mechanisms, such as the "auto tagging" mechanism, the "application assisted tagging" mechanism and the "user defined tagging" mechanism as discussed further below in connection with FIGS. 5-8. Tagging mechanism 105 represents any or all of these different tagging mechanisms.

Figure 2:
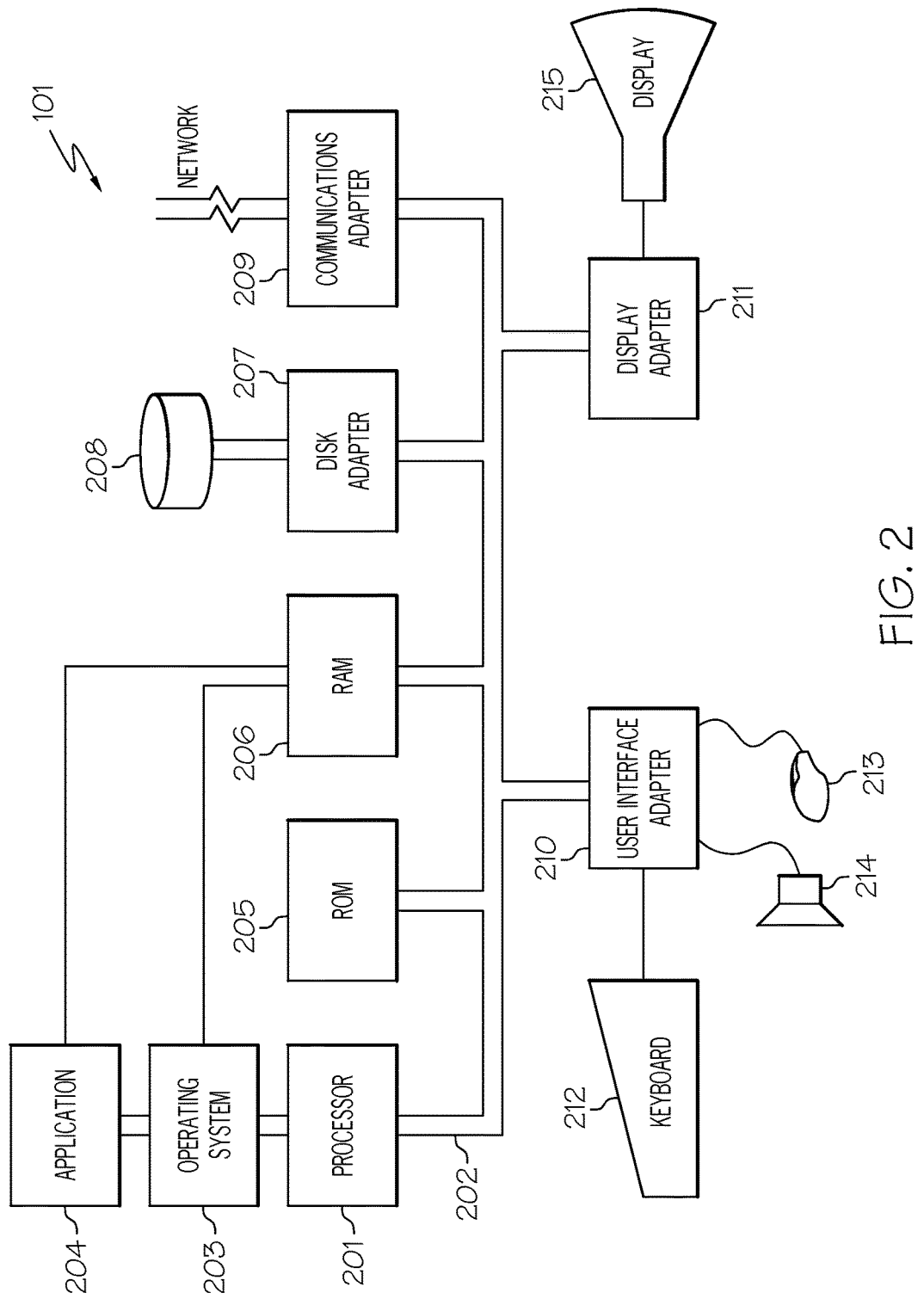
FIG. 2 illustrates a hardware configuration of a mobile device in accordance with an embodiment of the present invention.

Referring now to FIG. 2, FIG. 2 illustrates a hardware configuration of mobile device 101 which is representative of a hardware environment for practicing the present invention. Referring to FIG. 2, mobile device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a mobile agent 104 (FIG. 1) and tagging mechanism 105 (FIG. 1) configured to control enterprise data on mobile device 101, as discussed further below in association with FIGS. 3-11.

Referring again to FIG. 2, read-only memory ("ROM") 205 is coupled to system bus 202 and includes a basic input/output system ("BIOS") that controls certain basic functions of mobile device 101. Random access memory ("RAM") 206 and disk adapter 207 are also coupled to system bus 202. It should be noted that software components including operating system 203 and application 204 may be loaded into RAM 206, which may be mobile device's 101 main memory for execution. Disk adapter 207 may be an integrated drive electronics ("IDE") adapter that communicates with a disk unit 208, e.g., disk drive.

Mobile device 101 may further include a communications adapter 209 coupled to bus 202. Communications adapter 209 interconnects bus 202 with an outside network (network 103 of FIG. 1) thereby enabling mobile device 101 to communicate with management server 102 (FIG. 1).

I/O devices may also be connected to mobile device 101 via a user interface adapter 210 and a display adapter 211. Keyboard 212, mouse 213 and speaker 214 may all be interconnected to bus 202 through user interface adapter 210. Data may be inputted to mobile device 101 through any of these devices. A display monitor 215 may be connected to system bus 202 by display adapter 211. In this manner, a user is capable of inputting to mobile device 101 through keyboard 212 or mouse 213 and receiving output from mobile device 101 via display 215 or speaker 214. Other input mechanisms may be used to input data to mobile device 101 that is not shown in FIG. 2, such as display 215 having touch-screen capability.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, employees that are performing work on their mobile devices may be storing enterprise data on the mobile devices. Enterprise data on the mobile device may come from various sources, such as from enterprise applications, attachments in personal e-mails and so forth. However, the enterprise does not have any control over their applications or data that resides on these mobile devices which may have ramifications. For example, if the user lost his/her mobile device, then the enterprise data, which may be confidential, on the mobile device may be accessible by third parties, especially if the data is not encrypted or secured in some manner. In another example, if the user leaves the enterprise, then the former employee may have the freedom to dispense with the enterprise data in a manner that may be contrary to the wishes of the former employer. As a result, the enterprise needs the ability to control their applications and data that resides on employees' mobile devices to ensure that such data is not lost or used in a manner that is contrary to the wishes of the employer.

Figure 3:
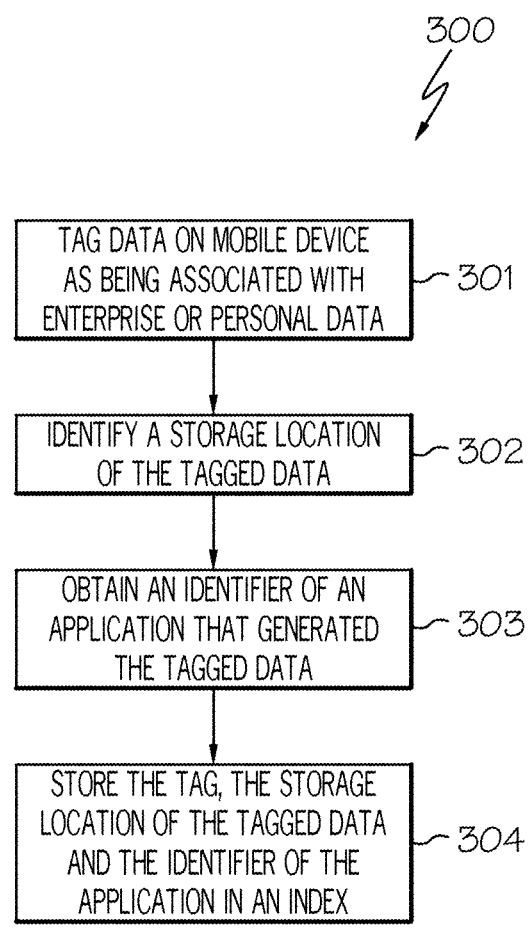
FIG. 3 is a flowchart of a method for controlling enterprise data on a mobile device via the use of a tag index in accordance with an embodiment of the present invention.
Figure 4:
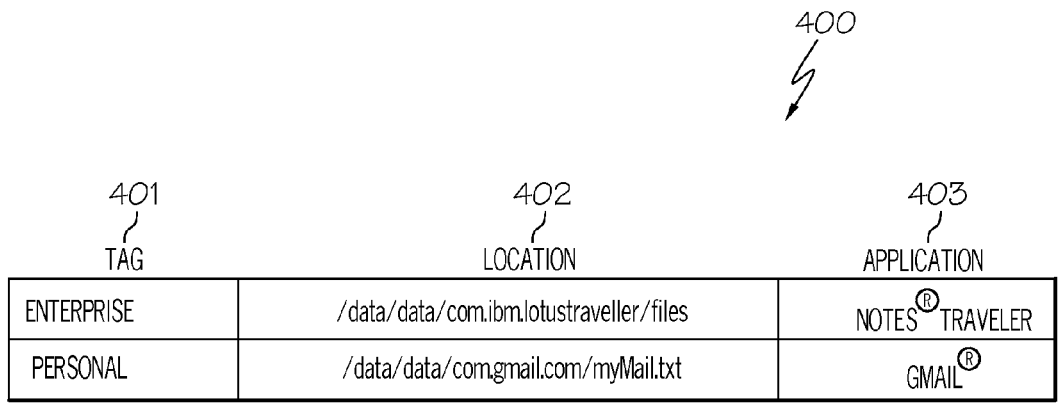
FIG. 4 illustrates a tag index for storing a tag, a storage location of the tagged data and an identifier of the application that generated the tagged data in accordance with an embodiment of the present invention.
Figure 5:
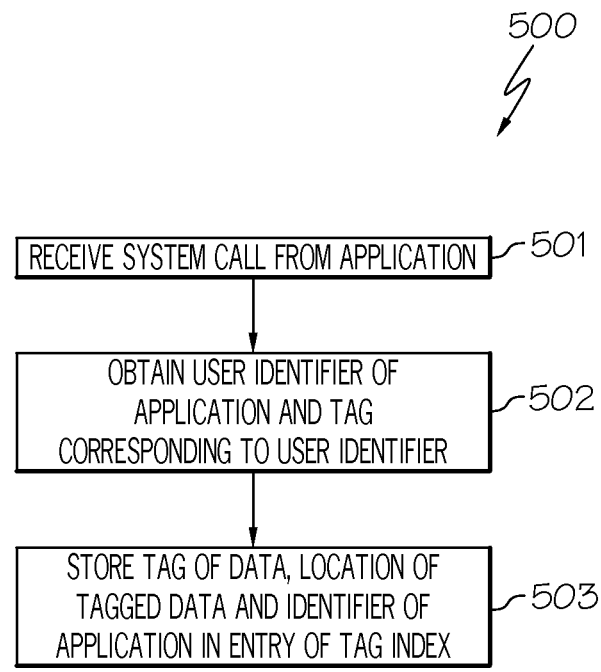
FIG. 5 is a flowchart of a method for performing "auto tagging" through a kernel intercept in accordance with an embodiment of the present invention.
Figure 6:
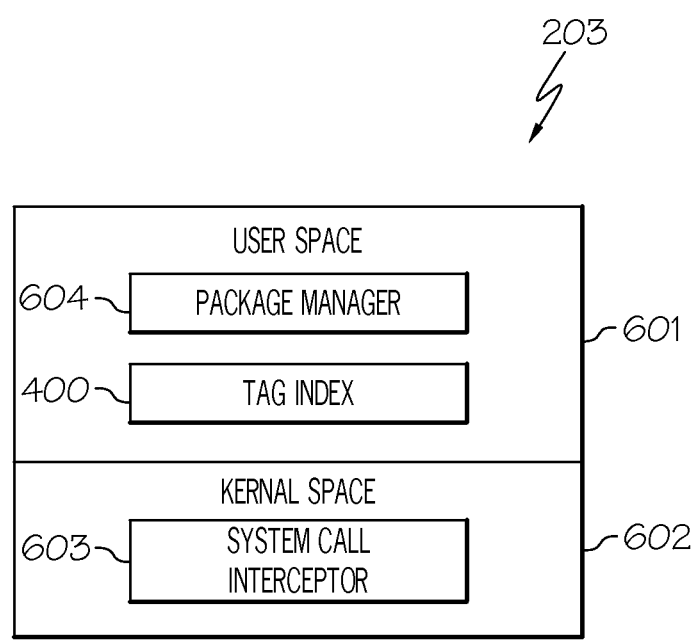
FIG. 6 illustrates the software components used in connection with performing auto tagging in accordance with an embodiment of the present invention.
Figure 7:
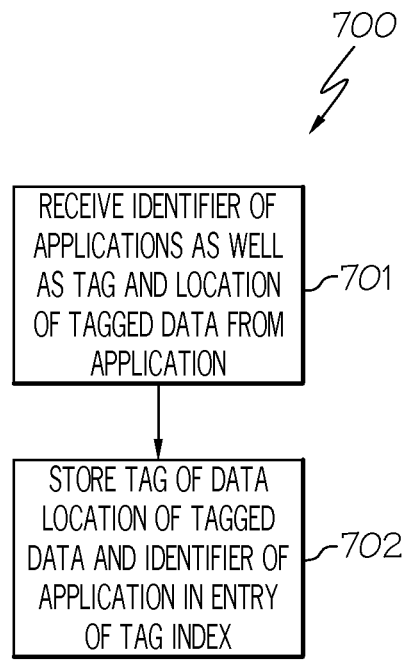
FIG. 7 is a flowchart of a method for performing "application assisted tagging" in accordance with an embodiment of the present invention.
Figure 8:
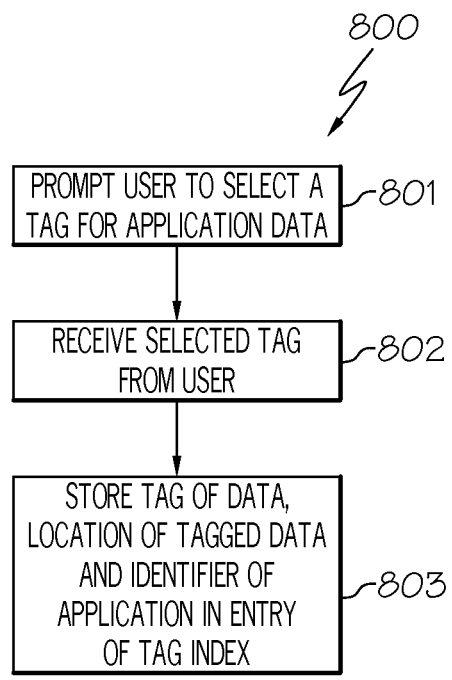
FIG. 8 is a flowchart of a method for performing "user defined tagging" in accordance with an embodiment of the present invention.
Figure 9:
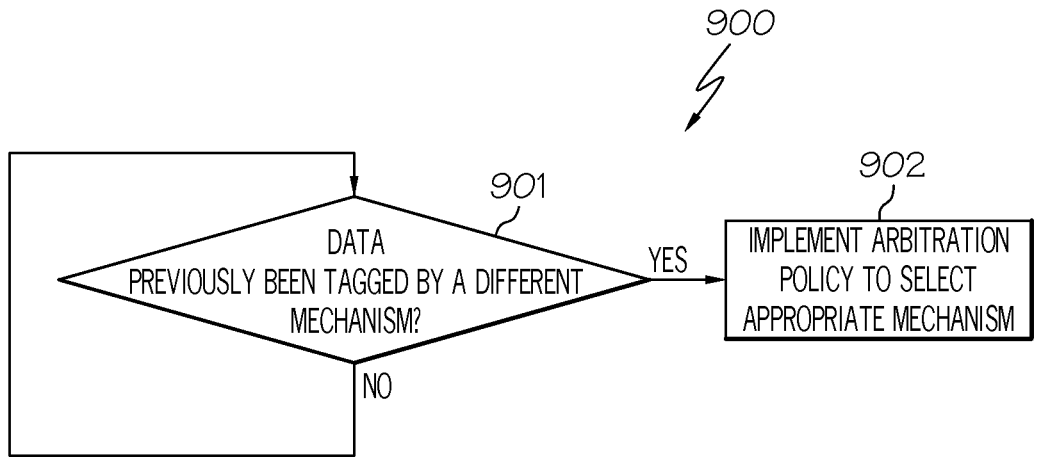
FIG. 9 is a flowchart of a method for implementing an arbitration policy to handle the situation of multiple tagging mechanisms tagging the same data in accordance with an embodiment of the present invention.
Figure 10:
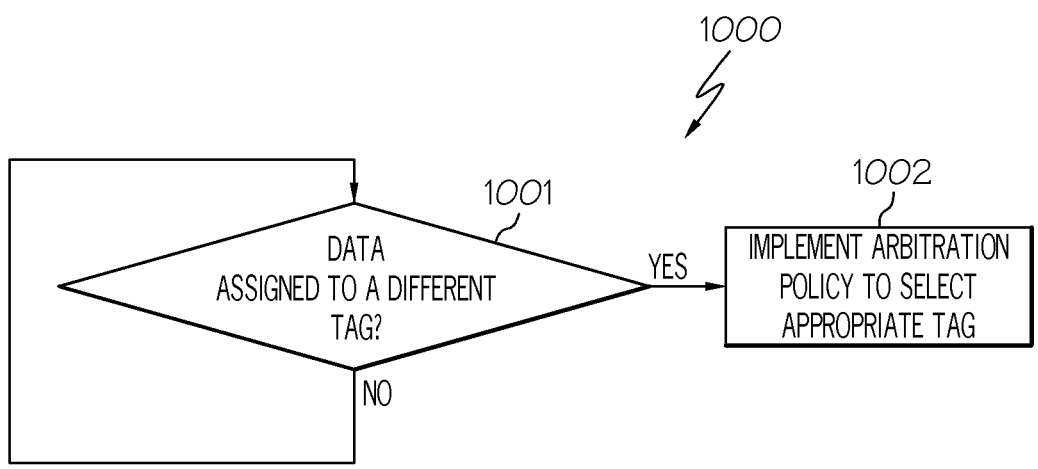
FIG. 10 is a flowchart of a method for implementing an arbitration policy to handle the situation of having different tags being associated with the same tagged data in accordance with an embodiment of the present invention.
Figure 11:
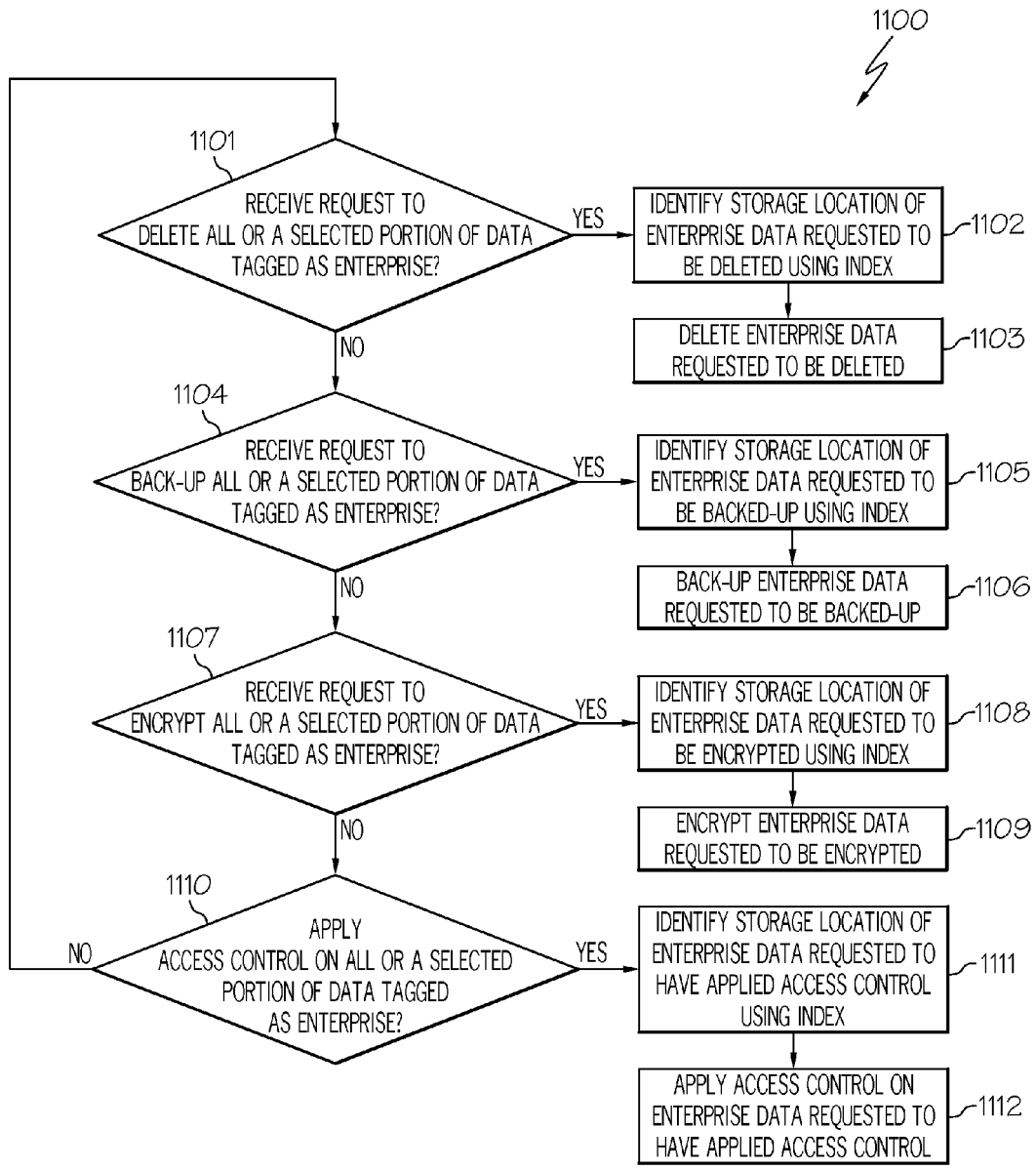
FIG. 11 is a flowchart of a method for controlling the enterprise data on the mobile device in response to commands issued by the mobile device management server in accordance with an embodiment of the present invention.

The principles of the present invention provide a means for the enterprise to control their applications and data that resides on employees' mobile devices to ensure that such data is not lost or used in a manner that is contrary to the wishes of the employer as discussed further below in connection with FIGS. 3-11. FIG. 3 is a flowchart of a method for controlling enterprise data on a mobile device via the use of a tag index. FIG. 4 illustrates a tag index for storing a tag, a storage location of the tagged data and an identifier of the application that generated the tagged data. FIG. 5 is a flowchart of a method for performing what is referred to herein as "auto tagging" through a kernel intercept. FIG. 6 illustrates the software components used in connection with performing auto tagging. FIG. 7 is a flowchart of a method for performing what is referred to herein as "application assisted tagging." FIG. 8 is a flowchart of a method for performing what is referred to herein as "user defined tagging." FIG. 9 is a flowchart of a method for implementing an arbitration policy to handle the situation of multiple tagging mechanisms tagging the same data. FIG. 10 is a flowchart of a method for implementing an arbitration policy to handle the situation of having different tags being associated with the same tagged data. FIG. 11 is a flowchart of a method for controlling the enterprise data on the mobile device in response to commands issued by the mobile device management server.

As stated above, FIG. 3 is a flowchart of a method 300 for controlling enterprise data on mobile device 101 via the use of a tag index in accordance with an embodiment of the present invention.

Referring to FIG. 3, in conjunction with FIGS. 1-2, in step 301, tagging mechanism 105 tags data on mobile device 101 as being associated with either enterprise or personal data. In one embodiment, there are various mechanisms for tagging data on mobile device 101 as being associated with either enterprise or personal data. When the data is tagged as being enterprise data, the "tag" corresponds to "enterprise." When the data is tagged as being personal data, the "tag" corresponds to "personal." In one embodiment, different tagging mechanisms may be used to tag the data on mobile device 101, such as the "auto tagging" mechanism, the "application assisted tagging" mechanism and the "user defined tagging" mechanism as discussed further below in connection with FIGS. 5-8. In each of these tagging mechanisms, in addition to tagging the data on mobile device 101 as being associated with either enterprise or personal data, a storage location of the tagged data and an identifier of the application that generated the tagged data are obtained as discussed further below in connection with FIG. 3.

In step 302, tagging mechanism 105 identifies a storage location of the tagged data. In step 303, tagging mechanism 105 obtains an identifier of the application that generated the tagged data.

In step 304, tagging mechanism 105 stores the tag, the storage location of the tagged data and the identifier of the application that generated the tagged data in an index as illustrated in FIG. 4.

FIG. 4 illustrates a tag index 400 for storing a tag 401, a storage location 402 of the tagged data and an identifier 403 of the application that generated the tagged data in accordance with an embodiment of the present invention. Referring to FIG. 4, index 400 includes tags, such as "enterprise" and "personal" well as the location of the tagged data. For example, the data tagged as being "enterprise" data resides at "/data/data/com.ibm.lotustraveller/files." In another example, the data tagged as being "personal" data resides at "data/data/com.gmail.com/myMail.txt." Index 400 further stores an identifier 403 of the application that generated the tagged data. For example, the data tagged as being "enterprise" data was generated by Notes® Traveler. The data tagged as being "personal" data was generated by Gmail®. In one embodiment, index 400 is stored in disk unit 208. In another embodiment, index 400 is stored in the user space of operating system 203 as discussed further below in connection with FIG. 6.

By having index 400 store a tag 401, a storage location 402 of the tagged data and an identifier 403 of the application that generated the tagged data, enterprises will be able to control their enterprise data (e.g., deleting, encrypting, backing-up, applying access control) on mobile device 101 as discussed further below.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

As discussed above, in one embodiment, the principles of the present invention may implement multiple tagging mechanisms. FIG. 5 is a flowchart of a method 500 for performing what is referred to herein as "auto tagging" through a kernel intercept in accordance with an embodiment of the present invention. FIG. 5 will be discussed in conjunction with FIG. 6, which illustrates the software components used in connection with performing auto tagging in accordance with an embodiment of the present invention.

Referring to FIG. 6, a conventional operating system 203 (FIG. 2) usually segregates the virtual memory into user space 601 and kernel space 602. User space 601 is the memory area where all user mode applications work; whereas, kernel space 602 is strictly reserved for running the kernel, kernel extensions, and most device drivers. Kernel space 602 includes a software component referred to as a "system call interceptor" 603 and user space 601 includes a software component referred to as a "package manager" 604 as well as index 400. A further description of these software components will be provided in connection with the discussion of FIG. 5.

Referring now to FIG. 5, in conjunction with FIGS. 1, 2 and 6, in step 501, system call interceptor 603 in kernel space 602 receives a system call from an application (e.g., Facebook®). A system call may refer to how an application requests a service (e.g., write data) from an operating system's kernel.

In step 502, system call interceptor 603 obtains the user identifier of the requesting application as well as the tag corresponding to the user identifier from package manager 604. In one embodiment, package manager 604 is a collection of software tools to automate the process of installing, upgrading, configuring and removing software packages for a computer's operating system 203 in a consistent manner. In one embodiment, package manager 604 maintains a database that includes the user identifications of applications as well as the tags (e.g., enterprise, personal) associated with such applications. For example, in one embodiment, all data generated by an application may be deemed to be enterprise data. As a result, the tag associated with the user identification of that application would correspond to "enterprise."

In step 503, system call interceptor 603 stores the tag (obtained in step 502), the location of the tagged data (i.e., the location of the data to be written as requested by the application) and the identifier of the application (system call interceptor 603 obtains the identifier of the application when the application issues the system call to the system call interceptor 603) in index 400.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

Another mechanism for tagging is discussed in connection with FIG. 7. FIG. 7 is a flowchart of a method 700 for performing what is referred to herein as "application assisted tagging" in accordance with an embodiment of the present invention.

Referring to FIG. 7, in conjunction with FIGS. 1-2, in step 701, tagging mechanism 105 receives an identifier of the application (e.g., Gmail®) as well as the tag and location of the tagged data from the application.

In step 702, tagging mechanism 105 stores the tag, the location of the tagged data and the identifier of the application in an entry of index 400.

In some implementations, method 700 may include other and/or additional steps that, for clarity, are not depicted. Further, in some implementations, method 700 may be executed in a different order presented and that the order presented in the discussion of FIG. 7 is illustrative. Additionally, in some implementations, certain steps in method 700 may be executed in a substantially simultaneous manner or may be omitted.

Another mechanism for tagging is discussed in connection with FIG. 8. FIG. 8 is a flowchart of a method 800 of performing what is referred to herein as "user defined tagging" in accordance with an embodiment of the present invention.

Referring to FIG. 8, in conjunction with FIGS. 1-2, in step 801, tagging mechanism 105 prompts the user to select a tag (e.g., enterprise, personal) for application data.

In step 802, tagging mechanism 105 receives the selected tag from the user.

In step 803, tagging mechanism 105 stores the tag, the location of the tagged data and the identifier of the application in an entry of index 400.

In some implementations, method 800 may include other and/or additional steps that, for clarity, are not depicted. Further, in some implementations, method 800 may be executed in a different order presented and that the order presented in the discussion of FIG. 8 is illustrative. Additionally, in some implementations, certain steps in method 800 may be executed in a substantially simultaneous manner or may be omitted.

As a result of having multiple tagging mechanisms, there may be times when multiple tagging mechanisms tag the same data or having different tags being associated with the same tagged data. In such scenarios, arbitration policies are implemented to handle such situations as discussed below in connection with FIGS. 9-10.

FIG. 9 is a flowchart of a method 900 for implementing an arbitration policy to handle the situation of multiple tagging mechanisms tagging the same data in accordance with an embodiment of the present invention.

Referring to FIG. 9, in conjunction with FIGS. 1-2, in step 901, mobile agent 104 determines if the data has been previously tagged by a different mechanism. If the data has not been previously tagged by a different mechanism, then mobile agent 104 continues to determine if there is data that has been previously tagged by a different mechanism in step 901.

If, however, the data has been previously tagged by a different mechanism, then, in step 902, mobile agent 104 implements an arbitration policy to select the appropriate tagging mechanism. For example, the arbitration policy may be that "auto tagging" always takes priority over "application assisted tagging" which takes priority over "user defined tagging."

In some implementations, method 900 may include other and/or additional steps that, for clarity, are not depicted. Further, in some implementations, method 900 may be executed in a different order presented and that the order presented in the discussion of FIG. 9 is illustrative. Additionally, in some implementations, certain steps in method 900 may be executed in a substantially simultaneous manner or may be omitted.

FIG. 10 is a flowchart of a method 1000 for implementing an arbitration policy to handle the situation of having different tags being associated with the same tagged data in accordance with an embodiment of the present invention.

Referring to FIG. 10, in conjunction with FIGS. 1-2, in step 1001, mobile agent 104 determines if the data has been previously assigned a different tag. For example, one mechanism may assign the tag of "enterprise" while another mechanism may assign the tag of "personal" to the same data. If the data has not been previously assigned a different tag, then mobile agent 104 continues to determine if the data has been previously assigned a different tag in step 1001.

If, however, the data has been previously assigned a different tag, then, in step 1002, mobile agent 104 implements an arbitration policy to select the appropriate tag. For example, the arbitration policy may be that the "enterprise" tag always takes priority over the "application" tag.

In some implementations, method 1000 may include other and/or additional steps that, for clarity, are not depicted. Further, in some implementations, method 1000 may be executed in a different order presented and that the order presented in the discussion of FIG. 10 is illustrative. Additionally, in some implementations, certain steps in method 1000 may be executed in a substantially simultaneous manner or may be omitted.

As discussed above, index 400 is used to enable the enterprise to control their enterprise data (e.g., deleting, encrypting, backing-up, applying access control) on mobile device 101. A manner of using index 400 to enact such control is discussed below in connection with FIG. 11.

FIG. 11 is a flowchart of a method 1100 for controlling the enterprise data on mobile device 101 (FIGS. 1 and 2) in response to commands issued by mobile device management server 102 (FIG. 1) in accordance with an embodiment of the present invention.

Referring to FIG. 11, in conjunction with FIGS. 1-2, in step 1101, a determination is made by mobile agent 104 as to whether it received a request from management server 102 to delete all or a selected portion of the data tagged as being enterprise data.

If mobile agent 104 received a request from management server 102 to delete all or a selected portion of the data tagged as enterprise data, then, in step 1102, mobile agent 104 identifies the storage location of the tagged data to be deleted using index 400. In step 1103, mobile agent 104 deletes the tagged data requested to be deleted.

If, however, mobile agent 104 did not receive a request from management server 102 to delete all or a selected portion of the data tagged as enterprise data, then, in step 1104 a determination is made by mobile agent 104 as to whether it received a request from management server 102 to back-up all or a selected portion of data tagged as being enterprise data.

If mobile agent 104 received a request from management server 102 to back-up all or a selected portion of the data tagged as enterprise data, then, in step 1105, mobile agent 104 identifies the storage location of the tagged data to be backed-up using index 400. In step 1106, mobile agent 104 backs-up the tagged data requested to be backed-up.

If, however, mobile agent 104 did not receive a request from management server 102 to back-up all or a selected portion of the data tagged as enterprise data, then, in step 1107 a determination is made by mobile agent 104 as to whether it received a request from management server 102 to encrypt all or a selected portion of data tagged as being enterprise data.

If mobile agent 104 received a request from management server 102 to encrypt all or a selected portion of the data tagged as enterprise data, then, in step 1108, mobile agent 104 identifies the storage location of the tagged data to be encrypted using index 400. In step 1109, mobile agent 104 encrypts the tagged data requested to be encrypted.

If, however, mobile agent 104 did not receive a request from management server 102 to encrypt all or a selected portion of the data tagged as enterprise data, then, in step 1110 a determination is made by mobile agent 104 as to whether it received a request from management server 102 to apply access control to all or a selected portion of data tagged as being enterprise data.

If mobile agent 104 received a request from management server 102 to apply access control to all or a selected portion of the data tagged as enterprise data, then, in step 1111, mobile agent 104 identifies the storage location of the tagged data to have applied access control using index 400. In step 1112, mobile agent 104 applies access control on the tagged data requested to have applied access control.

If, however, mobile agent 104 did not receive a request from management server 102 to apply access control to all or a selected portion of the data tagged as enterprise data, then a determination is made by mobile agent 104 in step 1101 as to whether it received a request from management server 102 to delete all or a selected portion of the data tagged as being enterprise data.

In some implementations, method 1100 may include other and/or additional steps that, for clarity, are not depicted. Further, in some implementations, method 1100 may be executed in a different order presented and that the order presented in the discussion of FIG. 11 is illustrative. Additionally, in some implementations, certain steps in method 1100 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product embodied in a computer readable storage medium for controlling enterprise data on mobile devices, the computer program product comprising the programming instructions for:
   tagging data on a mobile device as being associated with one of enterprise data and personal data with a tag;
   identifying a storage location of said tagged data;
   obtaining an identifier of an application that generated said tagged data;
   storing said tag indicating one of said enterprise data and said personal data, said storage location of said tagged data and said identifier of said application in a single index; and
   implementing an arbitration policy to select an appropriate tag associated with said tagged data on said mobile device in response to different tags being associated with said tagged data on said mobile device.

2. The computer program product as recited in claim 1 further comprising the programming instructions for:
   receiving a system call from said application;
   obtaining a user identifier of said application; and
   obtaining said tag corresponding to said user identifier of said application.

3. The computer program product as recited in claim 1 further comprising the programming instructions for:
   receiving said identifier of said application, said tag and said storage location of said tagged data from said application.

4. The computer program product as recited in claim 1 further comprising the programming instructions for:
   prompting a user to select a tag for application data; and
   receiving said selected tag from said user.

5. The computer program product as recited in claim 1 further comprising the programming instructions for:
   receiving a request to delete all or a selected portion of data tagged as said enterprise data;
   identifying one or more storage locations of said tagged data to be deleted using said index; and
   deleting said tagged data requested to be deleted.

6. The computer program product as recited in claim 1 further comprising the programming instructions for:
   receiving a request to back-up all or a selected portion of data tagged as said enterprise data;
   identifying one or more storage locations of said tagged data to be backed-up using said index; and
   backing-up said tagged data requested to be backed-up.

7. The computer program product as recited in claim 1 further comprising the programming instructions for:
   receiving a request to encrypt all or a selected portion of data tagged as said enterprise data;
   identifying one or more storage locations of said tagged data to be encrypted using said index; and
   encrypting said tagged data requested to be encrypted.

8. The computer program product as recited in claim 1 further comprising the programming instructions for:
   receiving a request to apply access control on all or a selected portion of data tagged as said enterprise data;
   identifying one or more storage locations of said tagged data to have applied access control using said index; and
   applying access control on said tagged data requested to have applied access control.

9. A computer program product embodied in a computer readable storage medium for controlling enterprise data on mobile devices, the computer program product comprising the programming instructions for:
   tagging data on a mobile device as being associated with one of enterprise data and personal data with a tap;
   identifying a storage location of said tagged data;
   obtaining an identifier of an application that generated said tagged data;
   storing said tap indicating one of said enterprise data and said personal data, said storage location of said tapped data and said identifier of said application in a single index; and
   implementing an arbitration policy to select an appropriate tagging mechanism in response to different tagging mechanisms tagging said data on said mobile device.

10. A system, comprising:
    a memory unit for storing a computer program for controlling enterprise data on mobile devices; and
    a processor coupled to said memory unit, wherein said processor, responsive to said computer program, comprises:
       circuitry for tagging data on a mobile device as being associated with one of enterprise data and personal data with a tag;
       circuitry for identifying a storage location of said tagged data;
       circuitry for obtaining an identifier of an application that generated said tagged data;
       circuitry for storing said tag indicating one of said enterprise data and said personal data, said storage location of said tagged data and said identifier of said application in a single index; and
       circuitry for implementing an arbitration policy to select an appropriate tag associated with said tagged data on said mobile device in response to different tags being associated with said tagged data on said mobile device.

11. The system as recited in claim 10, wherein said processor further comprises:
    circuitry for receiving a system call from said application;
    circuitry for obtaining a user identifier of said application; and circuitry for obtaining said tag corresponding to said user identifier of said application.

12. The system as recited in claim 10, wherein said processor further comprises:
   circuitry for receiving said identifier of said application, said tag and said storage location of said tagged data from said application.

13. The system as recited in claim 10, wherein said processor further comprises:
   circuitry for prompting a user to select a tag for application data; and
   circuitry for receiving said selected tag from said user.

14. The system as recited in claim 10, wherein said processor further comprises:
   circuitry for receiving a request to delete all or a selected portion of data tagged as said enterprise data;
   circuitry for identifying one or more storage locations of said tagged data to be deleted using said index; and
   circuitry for deleting said tagged data requested to be deleted.

15. The system as recited in claim 10, wherein said processor further comprises:
   circuitry for receiving a request to back-up all or a selected portion of data tagged as said enterprise data;
   circuitry for identifying one or more storage locations of said tagged data to be backed-up using said index; and
   circuitry for backing-up said tagged data requested to be backed-up.

16. The system as recited in claim 10, wherein said processor further comprises:
   circuitry for receiving a request to encrypt all or a selected portion of data tagged as said enterprise data;
   circuitry for identifying one or more storage locations of said tagged data to be encrypted using said index; and
   circuitry for encrypting said tagged data requested to be encrypted.

17. The system as recited in claim 10, wherein said processor further comprises:
   circuitry for receiving a request to apply access control on all or a selected portion of data tagged as said enterprise data;
   circuitry for identifying one or more storage locations of said tagged data to have applied access control using said index; and
   circuitry for applying access control on said tagged data requested to have applied access control.

18. A system, comprising:
   a memory unit for storing a computer program for controlling enterprise data on mobile devices; and
   a processor coupled to said memory unit, wherein said processor, responsive to said computer program, comprises:
      circuitry for tagging data on a mobile device as being associated with one of enterprise data and personal data with a tag;
      circuitry for identifying a storage location of said tagged data;
      circuitry for obtaining an identifier of an application that generated said tagged data;
      circuitry for storing said tag indicating one of said enterprise data and said personal data, said storage location of said tagged data and said identifier of said application in a single index; and
      circuitry for implementing an arbitration policy to select an appropriate tagging mechanism in response to different tagging mechanisms tagging said data on said mobile device.

* * * * *